(12) United States Patent
Chiereghin et al.

(10) Patent No.: US 10,277,111 B2
(45) Date of Patent: Apr. 30, 2019

(54) OUTPUT OVERVOLTAGE PROTECTION FOR CONVERTERS

(71) Applicant: Infineon Technologies AG, Neubiberg (DE)

(72) Inventors: Cristina Chiereghin, Camposampiero (IT); Cristian Garbossa, Bressanone (IT); Stefano Orlandi, San Bonifacio (IT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 15/603,616

(22) Filed: May 24, 2017

(65) Prior Publication Data

US 2018/0342944 A1 Nov. 29, 2018

(51) Int. Cl.
*H02M 1/32* (2007.01)
*H02M 1/08* (2006.01)
*H02M 3/155* (2006.01)

(52) U.S. Cl.
CPC .............. *H02M 1/32* (2013.01); *H02M 1/08* (2013.01); *H02M 3/155* (2013.01)

(58) Field of Classification Search
CPC ................ H02M 1/08; H02M 1/32; H02M 3/155–3/1588
See application file for complete search history.

(56) References Cited

U.S. PATENT DOCUMENTS

| | | |
|---|---|---|
| 5,122,726 A | 6/1992 | Elliott et al. |
| 5,532,894 A | 7/1996 | Sweaton |
| 5,898,234 A * | 4/1999 | Kitagawa .................. H02J 9/06 307/48 |
| 6,031,743 A * | 2/2000 | Carpenter ............... H02J 1/102 307/48 |
| 6,411,483 B1 | 6/2002 | Sarles et al. |
| 6,662,084 B2 * | 12/2003 | Hiraki ....................... G06F 1/26 323/268 |
| 6,821,156 B1 * | 11/2004 | Egan ..................... H01R 12/721 439/630 |
| 7,084,612 B2 | 8/2006 | Zinn |
| 7,215,517 B2 | 5/2007 | Takamatsu |
| 7,414,371 B1 | 8/2008 | Choi et al. |
| 7,679,939 B2 | 3/2010 | Gong |
| 7,839,018 B2 * | 11/2010 | Chen ................. H01M 8/04537 307/44 |
| 9,106,075 B2 | 8/2015 | Tomas et al. |

(Continued)

FOREIGN PATENT DOCUMENTS

| | | |
|---|---|---|
| KR | 0120301 B1 | 10/1997 |
| KR | 20150031802 A | 3/2015 |

*Primary Examiner* — Yusef A Ahmed

(74) *Attorney, Agent, or Firm* — Slater Matsil, LLP

(57) ABSTRACT

According to an example, a step down converter includes switching circuit configured to control a switching output in order to generate an output voltage on a converter output within a specified range of a target voltage. The step down converter includes an inductor includes a first terminal and a second terminal, the first terminal coupled to the switching output, and a protection device coupled in series between the second terminal of the inductor and the converter output and including a control terminal. The protection device limits the output voltage supplied at the converter output based on a control voltage at the control terminal.

11 Claims, 10 Drawing Sheets

(56) References Cited

U.S. PATENT DOCUMENTS

| | | | |
|---|---|---|---|
| 9,240,679 B2* | 1/2016 | Jung | H02H 1/06 |
| 9,367,111 B2 | 6/2016 | Tomas et al. | |
| 9,407,086 B2 | 8/2016 | Veil et al. | |
| 9,473,028 B1* | 10/2016 | Hoyt | H02M 3/158 |
| 9,941,782 B2* | 4/2018 | Schuermann | H02M 1/32 |
| 2002/0130645 A1* | 9/2002 | Tsai | G05F 1/24 |
| | | | 323/274 |
| 2004/0227495 A1* | 11/2004 | Egan | G05F 1/618 |
| | | | 323/272 |
| 2005/0024016 A1* | 2/2005 | Breen | H02J 7/022 |
| | | | 320/128 |
| 2007/0273341 A1* | 11/2007 | Shimizu | H02M 1/36 |
| | | | 323/224 |
| 2008/0204956 A1 | 8/2008 | Hung | |
| 2008/0266740 A1* | 10/2008 | Smith | H02J 1/10 |
| | | | 361/91.5 |
| 2011/0267142 A1* | 11/2011 | Wismar | H02M 3/157 |
| | | | 330/129 |
| 2011/0304941 A1 | 12/2011 | Tanimura et al. | |
| 2013/0093247 A1 | 4/2013 | Park et al. | |
| 2013/0181729 A1* | 7/2013 | Egan | G01R 31/40 |
| | | | 324/750.01 |
| 2014/0071720 A1* | 3/2014 | Ouyang | H02H 7/1213 |
| | | | 363/50 |
| 2014/0145679 A1* | 5/2014 | Chen | H02M 3/1582 |
| | | | 320/128 |
| 2014/0145692 A1* | 5/2014 | Miyamae | H02M 3/158 |
| | | | 323/271 |
| 2015/0200586 A1* | 7/2015 | Liao | H02M 3/158 |
| | | | 323/282 |
| 2016/0043627 A1* | 2/2016 | Chen | H02M 3/1584 |
| | | | 323/271 |
| 2016/0285356 A1* | 9/2016 | Schuermann | H02M 1/32 |
| 2016/0359414 A1* | 12/2016 | Ozanoglu | H02M 3/1582 |
| 2017/0149333 A1* | 5/2017 | Uno | H02M 3/155 |
| 2017/0310216 A1* | 10/2017 | Gibson | H02M 3/158 |

* cited by examiner

US 10,277,111 B2

OUTPUT OVERVOLTAGE PROTECTION FOR CONVERTERS

BACKGROUND

Step down converters are pervasive in electronic applications from computers to automobiles. For example, modern vehicle typically use a large number of step down converters to convert the vehicle battery voltage to lower voltages required for the electronic components such as microprocessors, application specific integrated circuits, etc. used in vehicle electronic applications. Some automotive applications require that electronic systems survive a single point failure. One critical failure is a short of a high-side switch in the step down converter which may lead to overvoltage on the converter output, potentially damaging electronic components supplied by the step down converter.

SUMMARY

Figure 1:
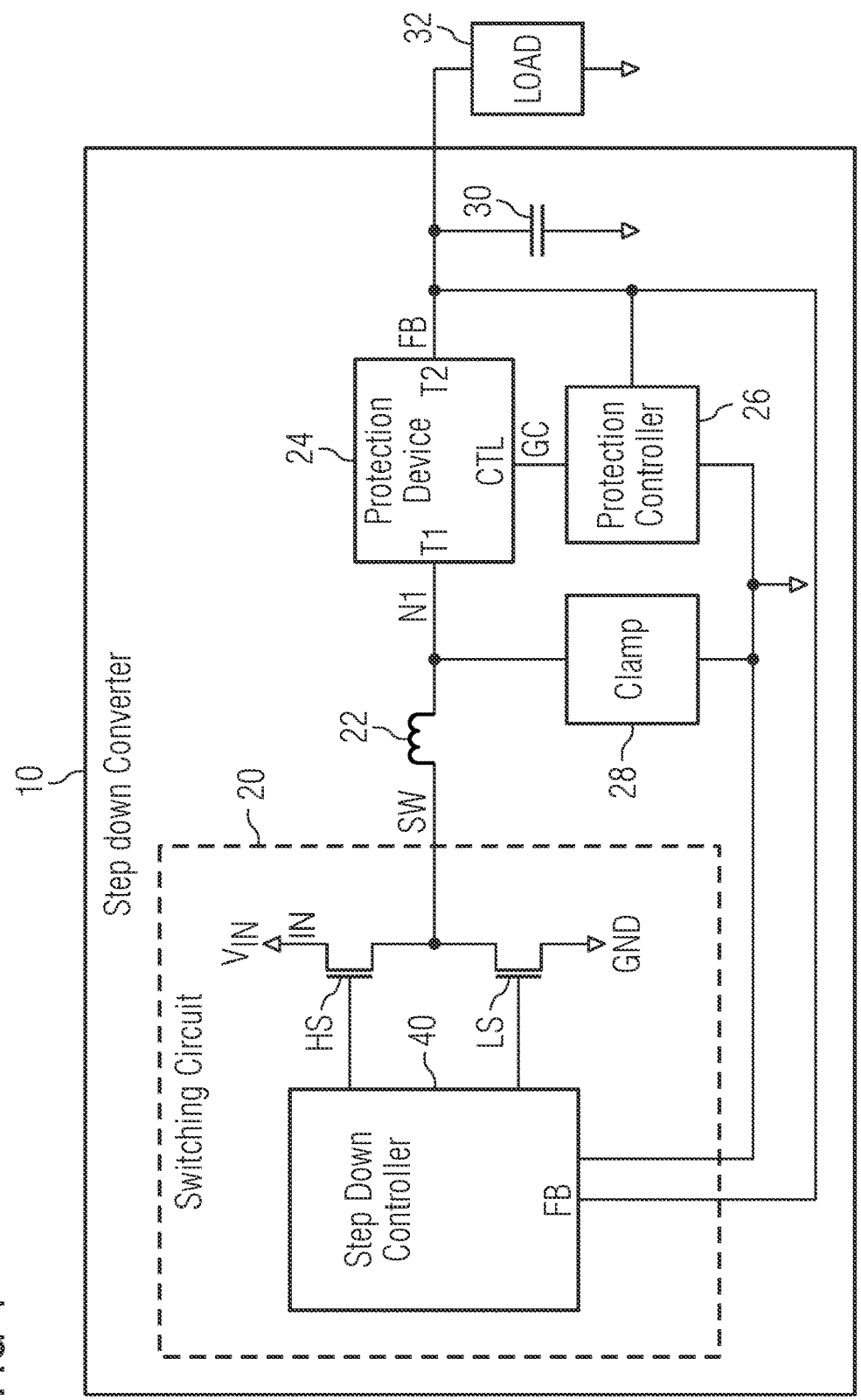
FIG. 1 is a diagram of an exemplary step down converter with output overvoltage protection.

According to an example, a step down converter includes a switching circuit configured to control a switching output in order to generate an output voltage on the converter output within a specified range of a target voltage. The step down converter further includes an inductor comprising a first terminal and a second terminal, the first terminal coupled to the switching output, and a protection device coupled in series between the second terminal of the inductor and the converter output and including a control terminal. The protection device limits the output voltage supplied at the converter output based at least in part on a control voltage at the control terminal.

According to another example, a step down device includes a control circuit for a step down converter comprising a switching output. The switching output is configured to be coupled to a first end of an inductor. The control circuit is configured to drive, via the switching output, the first end of the inductor to generate an output voltage on a feedback node of the control circuit based on a target voltage. The device further includes a protection device with a first terminal coupled to a protection input, a second terminal coupled to the feedback node, and a control terminal, the protection input configured to be coupled to a second end of the inductor. The protection device is configured to limit a voltage on the feedback node based in part on a control voltage applied to the control input.

According to another example, a method includes controlling an n-channel metal oxide semiconductor field effect transistor in a series circuit between a switching output of a step down converter and an output node of the step down converter to operate in triode mode. The method further includes switching the n-channel transistor to operate in a voltage-follower mode wherein the n-channel transistor prevents an output voltage of the step down converter from being driven above a control voltage of the n-channel transistor minus a threshold voltage of the n-channel transistor when the output voltage of the step down converter rises to or above a predetermined level. The method can further include detecting a short between a voltage input of the step down converter and the switching output; and changing a control voltage on a gate of the n-channel transistor from a first control voltage to a second lower control voltage.

DETAILED DESCRIPTION

With reference to the Figures, a step down converter for converting an input voltage to a lower output voltage includes a protection device to limit the output voltage below a predetermined level. A step down converter may also be referred to herein as a buck converter. The protection device limits the output voltage below the predetermined level in a case when a high-side switching node of the buck converter is shorted to the input voltage. Limiting the output voltage below the predetermined level may prevent the step down converter from damaging load devices that are supplied by the step down converter. As discussed in additional detail below, the predetermined level may be determined such that the predetermined level is greater than a maximum target output voltage $V_{target-max}$ of the step down converter and may further be selected such that the predetermined level is below a level that may damage load devices supplied by the step down converter. In some cases, the output voltage may be limited at such a level, that some or all load devices may maintain at least a minimum level of functionality.

FIG. 1 is a diagram of an exemplary step down converter 10. The step down converter 10 includes an input IN, an output FB, and a switching circuit 20 for converting an input voltage $V_{IN}$ on the input IN to an output voltage $V_{FB}$ on the output FB. The input IN and the output FB may also be referred to herein respectively as the node IN and the node FB. The switching circuit 20 includes a step down controller

40, a high-side switch HS and a low-side switch LS. The first terminal of the high-side switch HS is coupled to the input node IN and a second terminal of the high-side switch is coupled to the switching node SW. The first terminal of the low-side switch LS is coupled to ground (node GND) and the second terminal is coupled to the switching node SW. The step down controller 40 is coupled to a control input of the high-side switch HS and to a control input of the low-side switch LS. The step down controller 40 is configured to control the high-side switch HS and the low-side switch LS in order to generate a voltage $V_{FB}$ on the node FB within a specified range of the target voltage $V_{target}$, and may include one or more processors, memory, logic gates, and other passive and active electronic components. The memory may include instructions for the processor to perform processes such as the processes described herein.

The highest voltage in the specified range is referred to herein as the maximum target voltage $V_{target\text{-}max}$. The lowest voltage in the specified is referred to herein as the minimum target voltage $V_{target\text{-}min}$. The specified range may be, for example, $V_{target}+/-2\%$, where $V_{target\text{-}max}=V_{target}+2\%$ and $V_{target\text{-}min}=V_{target}-2\%$.

The step down converter 10 includes an energy storage inductor 22 with a first terminal coupled to the switching node SW and a second terminal coupled to a node N1. The step down converter 10 further includes a protection device 24 having a first terminal T1, a second terminal T2 and a control input CTL. The first terminal T1 of the protection device 24 is coupled to the node N1 and the second terminal T2 of protection device is coupled to the node FB. The control input CTL is coupled to a node GC and is driven by a voltage $V_{GC}$.

The step down converter 10 further includes a protection controller 26. The protection controller 26 generates the control voltage $V_{GC}$ and outputs the voltage $V_{GC}$ on the node GC for controlling the protection device 24. In some examples, the protection controller 26 provides a fixed voltage $V_{GC}$ on the node GC. The fixed voltage $V_{GC}$ may be, for example, generated by a charge pump, generated from $V_{IN}$ with the use of passive reference devices (e.g., Zener diodes, diodes, and resistors), etc. As described in detail below, the voltage $V_{GC}$ is generated such that the protection device 24 prevents the voltage $V_{FB}$ from being driven above a predetermined maximum voltage in the case of a failure of the switching circuit 20. In one example, the predetermined maximum voltage may be equal to or based on the maximum supply voltage rating $V_{max\_rat}$ of a load device supplied from the node FB of the step down converter 10.

In other examples, the protection controller 26 applies a first voltage $V_{GC}$ to the node GC during normal operation of the step down converter 10. Normal operation of the step down converter 10, 110 (FIG. 14), 210 (FIG. 15) is defined as operation wherein the respective step down controller 40, 140, 240 is operating to generate an output voltage on the node FB within a specified range of the target voltage $V_{target}$. Upon detection of a fault condition, such as a short between the node IN and the node SW, the protection controller 26 applies a second, lower voltage $V_{GC}$ to the node GC.

In other examples, the protection controller 26 is configured to turn the protection device 24 ON for normal operation, and turn the protection device 24 OFF for executing an automatic built-in self-test of the protection device 24. In an example, the protection controller 26 applies 0V to the node GC in order to turn the protection device 24 OFF for testing.

Additionally, the step down converter 10 may include a clamp 28. A first terminal of the clamp 28 may be coupled to the node N1 and a second terminal of the clamp 28 coupled to ground. As described below, the clamp 28 may be configured to prevent a voltage $V_{N1}$ on the node N1 from rising to a level that may cause damage to the protection device 24. The step down converter 10 further includes a capacitor 30 with the first terminal coupled to the node FB and the second terminal coupled to ground.

Figure 2:
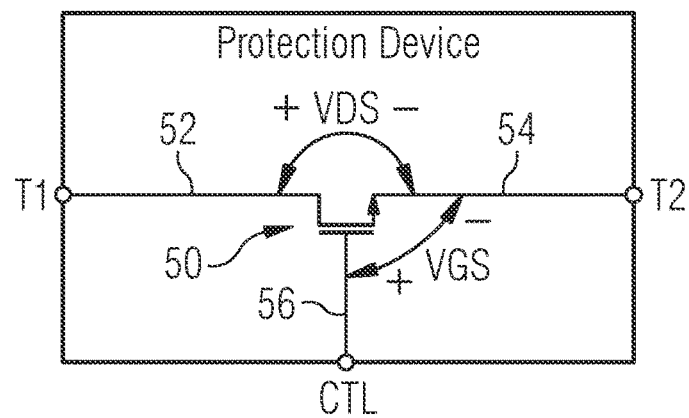
FIG. 2 is a diagram of an exemplary protection device comprising a metal-oxide-semiconductor field-effect transistor (n-channel transistor).

As shown in FIG. 2, an exemplary protection device 24 includes an n-channel metal-oxide-semiconductor field-effect transistor (n-channel transistor) 50. The n-channel transistor 50 includes a drain 52 coupled to the first terminal T1 of the protection device 24, a source 54 coupled to the second terminal T2 of the protection device 24, and a gate 56 coupled to the control terminal CTL of the protection device 24. The n-channel transistor 50 has a threshold voltage $V_{TH}$ and operates such that a positive voltage between the gate 56 and the source 54 of $V_{TH}$ or greater turns the n-channel transistor 50 on, allowing current to flow from the drain 52 to the source 54. A voltage $V_{DS}$ from the drain 52 to the source 54 is defined as positive when the voltage on the drain 52 is higher than the voltage on the source 54. A voltage $V_{GS}$ from the gate 56 to the source 54 is defined as positive when the voltage on the gate 56 is higher than the voltage on the source 54.

Figure 3:
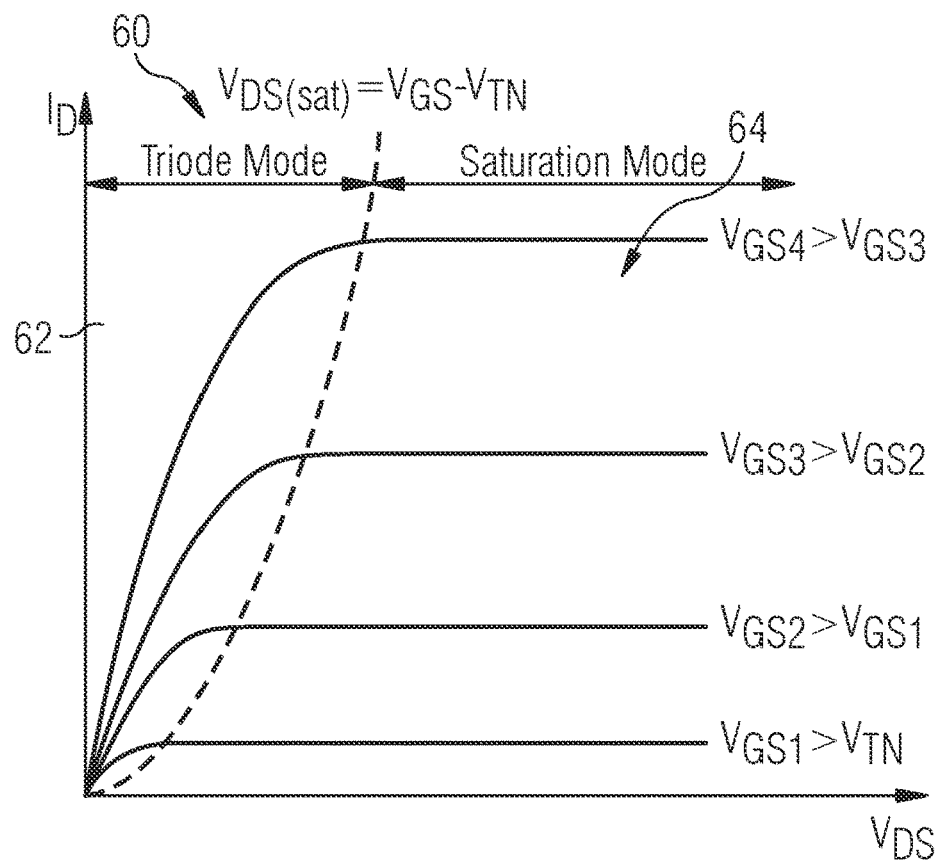
FIG. 3 illustrates a set of exemplary curves for the n-channel transistor of FIG. 2 indicating operating modes.

FIG. 3 illustrates an exemplary set of curves for the operation of an exemplary n-channel transistor 50. As can be seen, for voltages $V_{DS}$ less than $V_{GS}$ minus the threshold voltage $V_{TH}$, the n-channel transistor 50 operates in a triode or linear mode. The triode or linear mode may also be referred to herein as the triode or linear region. The triode mode is characterized by a strong and approximately linear relationship between the current $I_{DS}$ through the transistor and the voltage $V_{DS}$. The current $I_{DS}$ is defined as positive flowing into the drain 52 and out of the source 54. For voltages $V_{DS}$ greater than $V_{GS}$ minus the threshold voltage $V_{TH}$, the n-channel transistor 50 operates in a saturation mode. Again as shown in FIG. 3, the saturation mode is characterized by a greatly reduced dependence of $I_{DS}$ on $V_{DS}$, for a given value of the $V_{GS}-V_{TH}$, relative to the triode mode.

Figure 4:
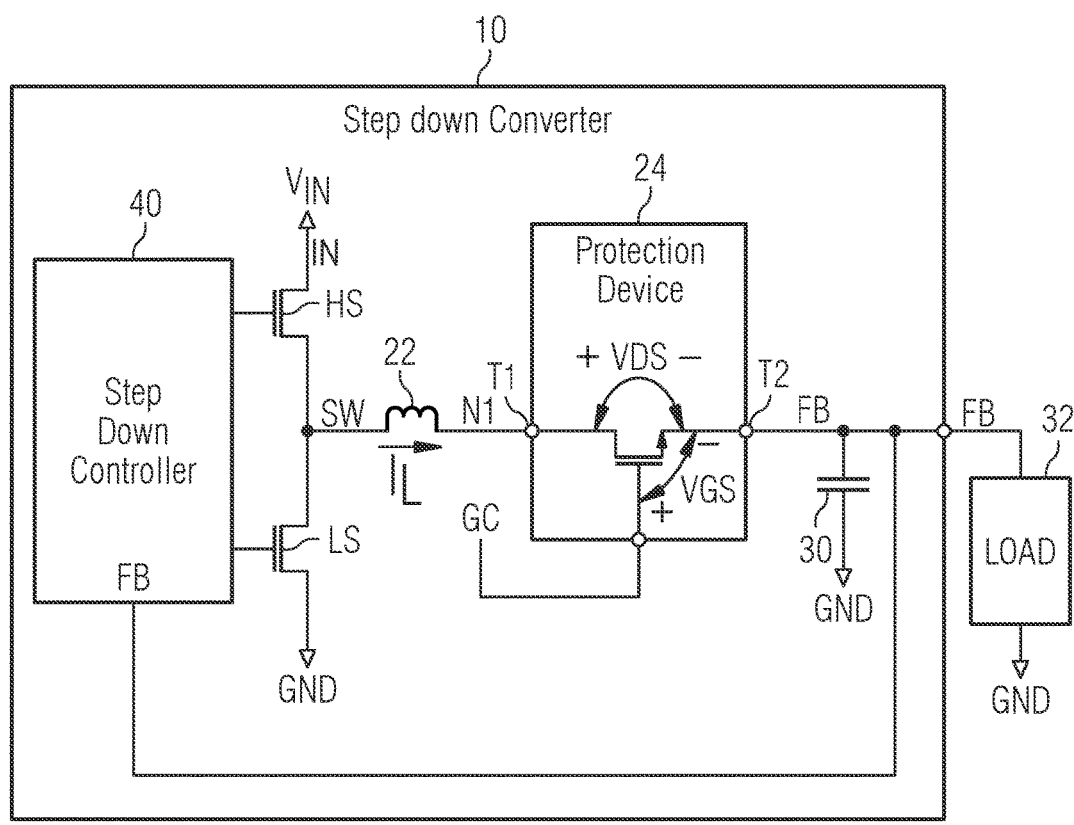
FIG. 4 is a diagram of an exemplary step down converter coupled to a load.

The n-channel transistor 50 can be configured to limit the voltage $V_{FB}$ on the node FB of the step down converter 10. FIG. 4 illustrates an example step down converter 10 including the n-channel transistor 50. A fixed voltage $V_{GC}$ is applied to the gate of the n-channel 50. The step down converter 10 is providing a voltage to a load 32.

In normal operation, the step down converter 10 receives a voltage $V_{IN}$ as an input, and controls the high-side switch HS and low-side switch LS to generate a voltage $V_{FB}$ on the node FB within a specified range of a target voltage $V_{target}$. A current $I_L$ is flowing through the inductor 22. For the step down converter 10, $V_{target}$, and $V_{FB}$ are lower than $V_{IN}$.

During normal operation, the n-channel transistor 50 is biased to operate in the triode region. The voltage $V_{GC}$ is applied to the gate 56 such that the drain source voltage $V_{DS}$ is less than $V_{GS}-V_{TH}$. In the case of a short across the high-side switch HS, i.e., a short between $V_{IN}$ and the node SW, the step down controller 40 will no longer be able to control the voltage $V_{FB}$, which will begin to rise toward the input voltage $V_{IN}$. As the voltage $V_{FB}$ rises, the operation of the n-channel transistor 50 will switch from the triode mode 62 to the saturation mode 64 of operation. As $V_{FB}$ increases towards the gate control voltage $V_{GC}$, the gate-source voltage $V_{GS}$ of the n-channel transistor 50 decreases. As $V_{GS}$ decreases to the threshold voltage of the n-channel transistor 50, the n-channel transistor enters a voltage-follower mode of operation, wherein the n-channel transistor begins to turn off. In the voltage-follower mode, the voltage $V_{FB}$ on the converter output node FB tracks the gate control voltage $V_{GC}$ offset by the threshold voltage $V_{TH}$ of the n-channel transistor 50. The n-channel transistor 50 prevents the output voltage $V_{FB}$ from being driven above a voltage $V_{failure}$ equal to $V_{GC}-V_{TH}$. $V_{TH}$, as used herein, is a characteristic of the n-channel transistor 50 that varies within a specified range based on material imperfections, manufacturing tolerances and bias conditions. One bias condition affecting $V_{TH}$ is the current from drain 52 to source 54 of the n-channel transistor 50, which corresponds to current $I_L$ being delivered to the load 32 as shown in FIG. 4.

In some cases, a maximum supply voltage $V_{max-rat}$ may be specified for the load 32. In order to protect the load 32 from damage, $V_{GC}$ can be selected such that $V_{failure}$ is equal to or less than $V_{max-rat}$.

An example for determining the voltage $V_{GC}$ follows. Let's assume:

$V_{target}$: the step down converter 10 regulation voltage (e.g. 5.6V+/−2%→$V_{target-max}$−5.7V)

$V_{failure}$: FB voltage in case of short between IN (supply voltage $V_{IN}$) and SW due to the protection action of the n-channel transistor 50.

$OV_{TH}$: overvoltage threshold usually present in a step down converter (e.g. 5.6V+10%, considering +/−1% accuracy→max $OV_{TH}$=6.2V)

$V_{TH}$=protection n-channel transistor 50 threshold voltage (e.g. 1.5V)

$V_{max\_rat}$=$V_{FB}$ maximum rating (e.g. 7V)

We have the following criteria to choose $V_G$c:

$V_{GC}>V_{target-max}+V_{TH}$: the switch has to operate in triode (linear) region.

$V_{failure} \sim V_{GC}-V_{TH} < V_{max\_rat}$.

$V_{failure} \sim V_{GC}-V_{TH} > OV_{th}$ in order not to interfere with normal operation.

Select $V_{GC}$ to be as low as possible in order to limit the maximum current through the inductor and the protection n-channel transistor 50 during the failure.

Based on the above, $V_{GC}$ can be determined as follows:

$V_{GC}>V_{target}$−max+$V_{TH}$=5.7V+1.5V→$V_{GC}$>7.2V $V_{GC}-V_{TH} < V_{max\_rat} \rightarrow V_{GC} < 7V+1.5V=8.5V$ $V_{GC}-V_{TH} > OV_{TH} \rightarrow V_{GC} > 6.2V+1.5V=7.7V$ $V_{GC}$=8V+/−2%=7.84V÷8.16V satisfies all criteria; $V_{failure}$=8V−1.5V=6.5V As described above, with $V_{GC}$ set at 8V nominal, $V_{FB}$ will be nominally 6.5V, and remain within the acceptable range of from 6.2V (step down converter 10 $OV_{TH}$) to 7V (the maximum voltage $V_{max\_rat}$ that can be supplied to the load 32.

The n-channel transistor 50 will reduce the efficiency of the step down converter 10, and can be dimensioned according to an acceptable efficiency loss. As an example, assume that an acceptable efficiency loss for the step down converter is determined to be 1%. Then, based on the assumptions above with regard to the operating conditions of the step down converter 10, the on resistance $R_{ON}$ of the n-channel transistor 50 can be calculated as follows:

$V_{FB}$=5.6V,$I_{FBmax}$=1A,η=90%→$P_{out}$=$V_{FB}$*$I_{FBmax}$=5.6 W;$P_{in}$=$P_{out}$/η=6.22 W $\eta_{acceptable}$=η−1%=89%→$P_{in\_acceptable}$=$P_{out}$/$\eta_{acceptable}$=6.29 W→$P_{loss\_nmos}$<$P_{in\_acceptable}$−$P_{in}$=70 mW $P_{loss\_nmos}$=$R_{ON}$*$I_{FBmax}^2$=70 mW→$R_{ON}$<0.07 W/1$A^2$~70 mΩ, where η is the efficiency of the step down converter 10 before the addition of the n-channel transistor 50=90%

$\eta_{acceptable}$ is the acceptable efficiency of the step down converter 10 after adding the n-channel transistor 50.

$P_{IN}$ is the input power to the step down converter 10 before addition of the n-channel transistor 50=6.22 W.

$P_{IN\_acceptable}$ is the input power to the step down converter 10 after addition of the n-channel transistor 50.

$P_{out}$ is the output power provided to the load 32=6.22 W.

$P_{loss\_nmos}$ is the power loss due to the n-channel transistor 50, $R_{ON}$ is the resistance of the maximum allowable resistance of the n-channel transistor to remain at or below $P_{loss\_nmos}$, $I_{FBmax}$ is the maximum output current of the step down converter. This may be, for example, the maximum current through the inductor 22 in case of a short between IN (supply voltage $V_{IN}$) and SW.

Figure 5:
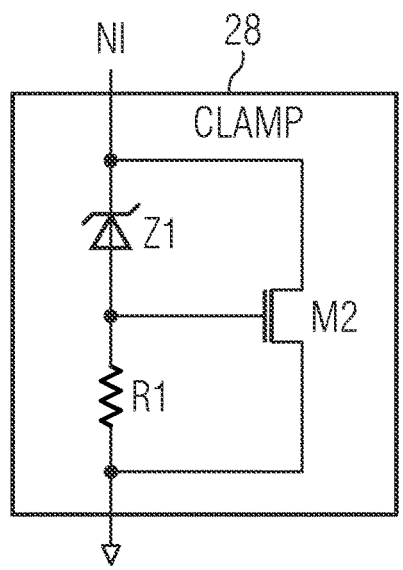
FIG. 5 is a diagram of an exemplary clamp for a step down converter.

At the onset of a short between $V_{IN}$ and SW, the voltage on node N1 may increase to a level that is potentially damaging to the n-channel transistor 50. In order to protect that n-channel transistor 50, the step down converter 10 may include a clamp 28 between the node N1 and ground. FIG. 5 is an example of a clamp 28 that may be used to limit voltage peaks on the node N1.

As shown in FIG. 5, the clamp 28 may include a Zener circuit Z1, a resistor R1 and a switch M2 which may be, for example, an n-channel transistor. The Zener circuit Z1 may include one or more electronic components such as Zener diodes, diodes, etc., and may be configured such that when a maximum voltage $V_{max-N1}$ appears on the node N1, the switch M2 turns on, allowing current to flow from the node N1 to ground, and preventing the voltage $V_{N1}$ from rising above $V_{max-N1}$. $V_{max-N1}$ may be determined, for example, to limit the voltage $V_{DS}$ from the drain 52 to the source 54 of the n-channel transistor 50 to a voltage below a voltage $V_{DS}$ maximum rating $V_{DS\_MAX}$ for the n-channel transistor 50.

Figure 6:
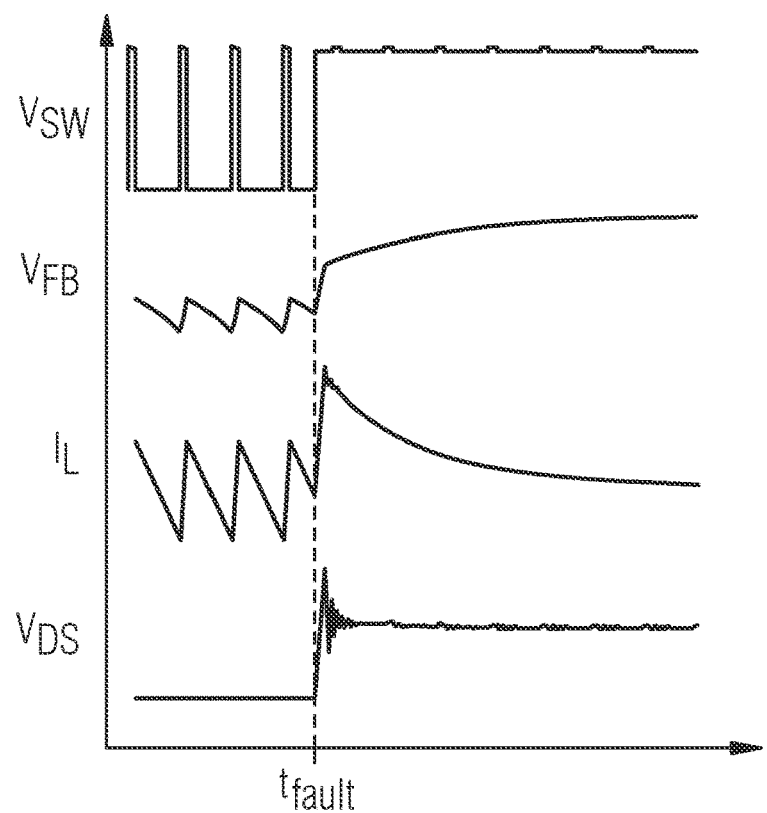
FIG. 6 illustrates exemplary waveforms indicating a response of the step down converter of FIG. 4 to a short of a high-side switch.

FIG. 6 illustrates exemplary waveforms for the step down converter 10 indicating a response of the step down converter 10 to a short between IN (supply voltage $V_{IN}$) and SW.

During normal operation, i.e., before the time $t_{fault}$, the step down controller 40 controls the high-side switch HS to maintain the voltage $V_{FB}$ within the specified range of the target voltage $V_{target}$. The voltage $V_{SW}$ may be, for example, a series of positive going pulses. Each pulse causes the voltage $V_{FB}$ to rise, along with the current $I_{FB}$. Following each pulse, the voltage $V_{FB}$ and the current $I_{FB}$ each slowly decay.

At the time $t_{fault}$, a short develops between the input voltage $V_{IN}$ and the switching node SW. The short may be hard short between the input node for $V_{IN}$ and the switching node SW, such as a metal short, or a damaged HS switch that cannot turn off. Additionally, the short may be a hard short (approximately 0 ohm, for example from a metal short), or a soft short wherein, for example, the high-side switch HS is damaged but continues to maintain a resistive character in the "OFF" state.

As shown in FIG. 6, the short at time $t_{fault}$ causes the node SW to rise to and remain at the voltage level $V_{IN}$. This results in the voltage $V_{FB}$ rising to a level $V_{failure}$. The n-channel transistor 50 prevents the voltage $V_{FB}$ from rising above the level of $V_{failure}$, as described above. $I_{FB}$ also rises, and then settles to a current level determined by the current required to supply the load 32 when operating at the voltage $V_{failure}$.

Due to energy stored in the inductor 22, at the time $t_{fault}$, the voltage $V_{N1}$ on the node N1, and thus the voltage $V_{DS}$ across the n-channel transistor 50, may increase rapidly. This is shown in the curve $V_{DS}$ in FIG. 6. As noted above, in some cases, depending on the current level of $I_{FB}$ and the maximum allowable voltage $V_{DS\_MAX}$ across the n-channel transistor 50, a clamp 28, for example from the node N1 to ground, may be required to prevent damage to the n-channel transistor 50.

Figure 7:
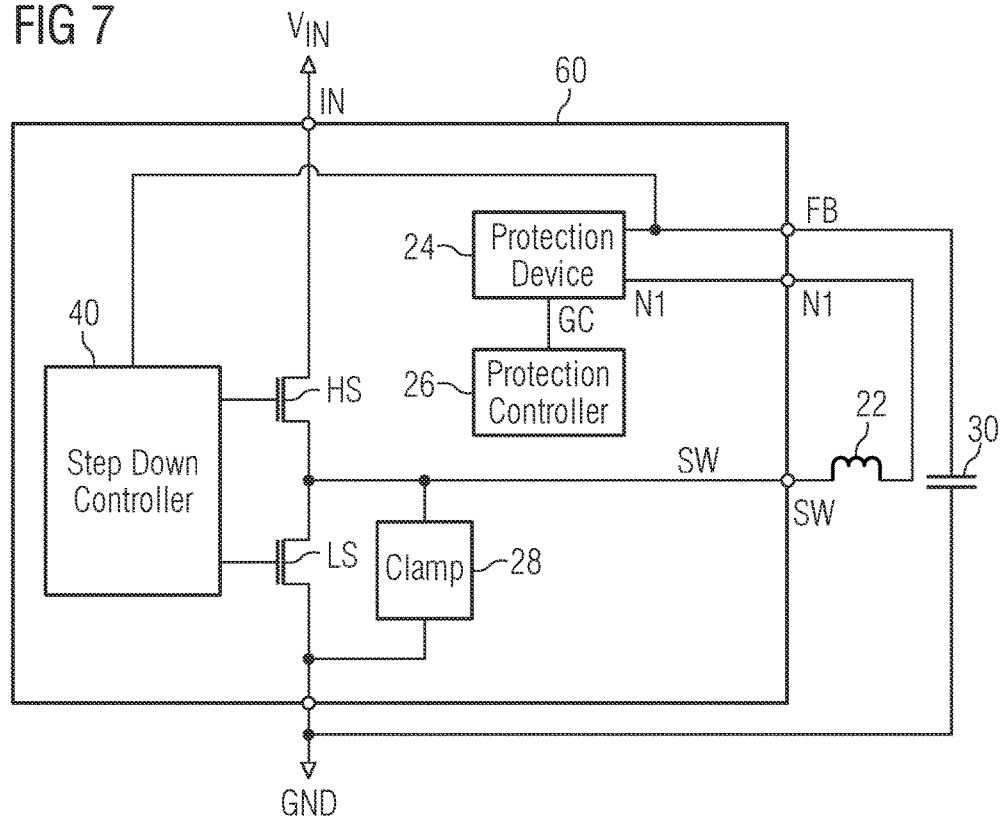
FIG. 7 is a diagram of an exemplary step down device for implementing a step down converter with output overvoltage protection.

In an example, as shown in FIG. 7, a step down device 60 includes an input IN for receiving the input voltage $V_{IN}$, a ground node GND, an output SW, an input N1 and an output FB. The step down device 60 includes a step down controller 40, a high-side switch HS with a first terminal coupled to IN and a second terminal coupled to SW and a low-side switch with a first terminal coupled to GND and a second terminal coupled to the node SW. The node SW is configured to be coupled to a first side of an inductor 22, external to the step down device 60.

The step down device 60 may further include the protection device 24. A first terminal T1 of the protection device 24 is coupled to the input node N1. The input node N1 is configured to be coupled to the second terminal if the inductor 22.

A second terminal T2 of the protection device 24 is coupled to node FB. The node FB is configured to be coupled to a capacitor 30 used to stabilize the output voltage $V_{FB}$ of the step down device 60.

The step down device 60 further includes the protection controller 26 for generating the control voltage $V_{GC}$ for the protection device 24 as described above.

In some cases, the step down device 60 may include a clamp 28 to prevent damage to the protection device 24 during a short from the input voltage $V_{IN}$ to the switching node SW. The clamp 28 may include a first terminal coupled to the input node N1 and a second terminal coupled to GND. As described above, the clamp 28 may be configured to prevent the voltage $V_{N1}$ on the node N1 from rising above a level that would result in a voltage $V_{DS}$ across the protection device 24 greater than a voltage $V_{DS\_MAX}$.

Figure 8:
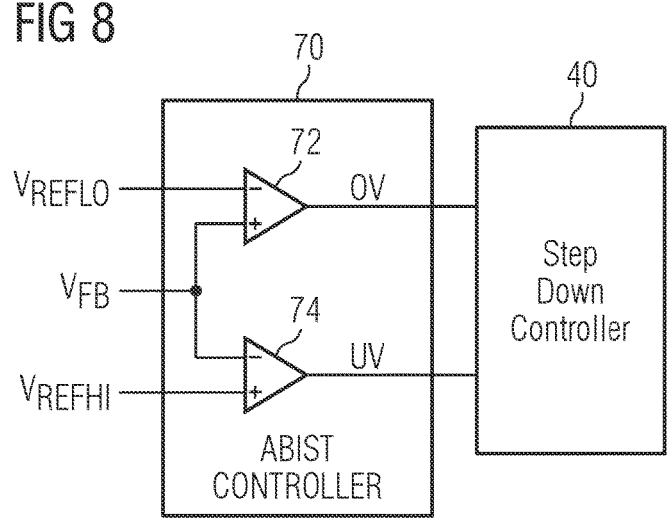
FIG. 8 is a diagram of an exemplary automatic built in self-test controller in communication with a step down controller.

The step down converter 10 may further include an automatic built-in self-test (ABIST) controller 70, for determining that the protection device 24 can be turned on and off. An example ABIST controller is shown in FIG. 8. A first comparator 72 determines whether the voltage $V_{FB}$ is above a low reference voltage $V_{REFLO}$. The low reference voltage $V_{REFLO}$ may be, for example, set to a voltage of 0.1 $V_{target}$. As described below with regard to the process 900, comparator 72 may be used to determine that the voltage $V_{FB}$ remains below the low reference voltage $V_{REFLO}$ when the high-side switch HS is turned on, and the protection device 24 is turned off. In the case that $V_{FB}$ is less than $V_{REFLO}$, the comparator 72 provides a low output on the signal OV (overvoltage) to the step down controller 40 indicating that the voltage $V_{FB}$ is below the low reference voltage $V_{REFLO}$.

In the case that $V_{FB}$ is greater than or equal to $V_{REFLO}$, the comparator 72 provides a high output on the signal OV indicating that $V_{FB}$ is greater than or equal to $V_{REFLO}$. $V_{FB}$ greater than or equal to $V_{REFLO}$ when the protection device 24 is turned off is indicative of a fault condition.

A second comparator 74 determines whether the voltage $V_{FB}$ is below a high reference voltage $V_{REFHI}$. The high reference voltage $V_{REFHI}$ may be, for example, set to a voltage of 0.9 $V_{target}$. The comparator 74 may be used to determine that the voltage $V_{FB}$ rises above the voltage $V_{REFHI}$ when the step-down converter 10 is operating in normal mode, and the protection device 24 is turned on. The comparator 74 provides a signal UV to the step down controller 40 indicating whether the voltage $V_{FB}$ is below the high reference voltage $V_{REFHI}$. For example, a high signal on UV may indicate that the voltage $V_{FB}$ is below the high reference voltage $V_{REFHI}$ when the step down converter 10 is operating in normal mode and the protection device 24 is turned ON, indicating a fault condition.

Figure 9:
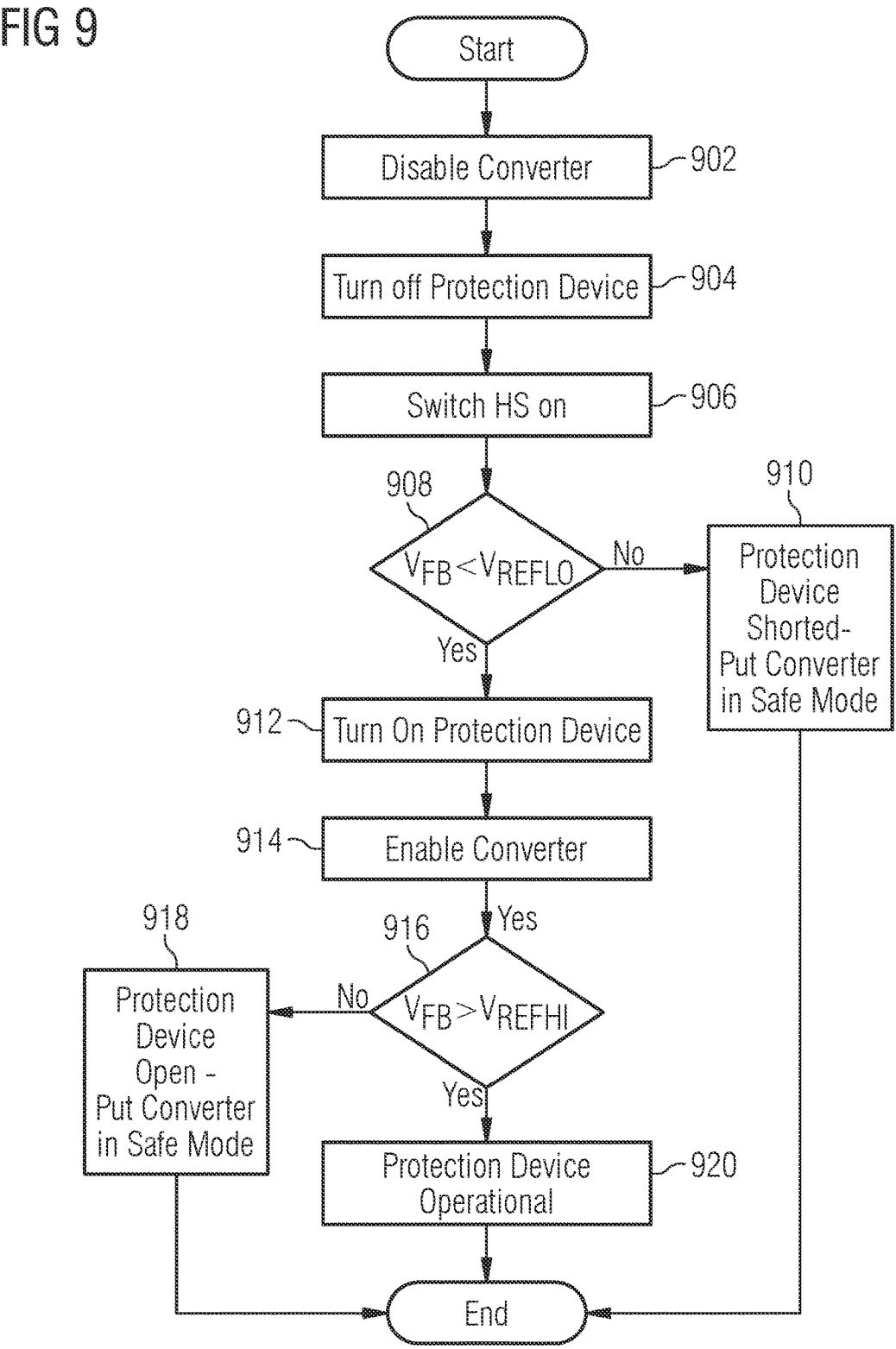
FIG. 9 is a diagram of an exemplary process for implementing automatic built-in self-test for an embodiment step down converter comprising a protection device.

FIG. 9 is a diagram of an exemplary process 900 for executing an automatic built-in self-test (ABIST) for the protection device 24. The process 900 starts in a block 902, and may be executed, for example, by the step down controller 40.

In the block 902, the step down controller 40 disables the normal operating mode of the step down converter 10. The step down controller 40 may, for example, switch both the HS switch HS and the low-side switch LS off. The process 900 continues in a block 904.

In the block 904, the step down controller 40, for example, via the protection controller 26, switches the node GC to 0V in order to turn off the protection device 24. The process 900 then continues in a block 906.

In the block 906, the step down controller 40 turns the high-side switch HS on. The process 900 then continues in a block 908.

In the block 908, the step down controller 40 determines, based on the output OV (overvoltage) from the ABIST controller 70, whether the voltage $V_{FB}$ on the node FB is less than $V_{REFLO}$. In a case that $V_{FB}$ is less than $V_{REFLO}$, the process 900 continues in a block 912. In a case that $V_{FB}$ is greater than or equal to $V_{REFLO}$, the process 900 continues in a block 910.

In the block 910 the step down controller 40 determines, based on the condition $V_{FB}$ greater than or equal to $V_{REFLO}$, that the protection device 24 is shorted. The step down controller 40 sets the step down converter 10 in a safe mode. For example, the step down controller 40 may turn off the high-side switch HS to prevent $V_{FB}$ from rising above safe levels. The step down controller 40 may further place other components of the step down converter 10 in known states. Upon setting the step down converter 10 in a safe mode, the process 900 ends.

In the block 912, which follows the block 908, the step down controller 40 turns on the protection device 24. For example, the step down controller 40 may, via the protection controller 26, set the voltage $V_{GC}$ at the nominal voltage for operation. The process 900 continues in a block 914.

In the block 914, the step down controller 40 may activate a normal operating mode wherein the step down converter 10 regulates the voltage $V_{FB}$ to be within a specified range of $V_{target}$. Upon activating the normal operating mode, the process 900 continues in a block 916.

In the block 916, the step down controller 40 determines whether $V_{FB}$ is greater than $V_{REFHI}$. In the case that $V_{FB}$ is greater than $V_{REFHI}$, the process 900 continues in a block 920. In the case that $V_{FB}$ is less than or equal to $V_{REFHI}$, the process 900 continues in a block 918.

In the block 918, the step down controller 40 determines, based on the condition $V_{FB}$ less than or equal to $V_{REFHI}$, that the protection device 24 is open. The step down controller 40 put the step down converter 10 in a safe mode. The process 900 ends.

In the block 920, which follows the block 916, the step down controller 40 determines, based on the condition n $V_{FB}$ greater than $V_{REFHI}$, that the protection device 24 is operational. The process 900 ends.

In an example of the step down converter 10, it may be desired to detect a short of the high-side switch HS, i.e., a short from the node IN to the node SW. Detecting a short on the high-side switch HS may allow the step down converter 10 to generate, for example, a Short_H signal that can be used to inform load devices 32 of the fault condition. Based on this information, load devices 32 may turn off non-essential functions, thereby reducing power consumption on the node FB while maintaining essential functions. For example, one or more of the load devices 32 may be designed to include a reduced power mode that includes some functions determined to be essential for operation of an application, and shut-off, based on receiving a Short_H signal indicating a fault condition in the step down converter 10, other functions in order to reduce power consumption.

In addition, the step down converter 10 may, based on the Short_H signal, adjust the operation of internal components. For example, upon detecting a short on the high-side switch HS, the step down controller 40 may, via the protection controller 26, switch the voltage $V_{GC}$ from a first voltage level to a second voltage level. The first voltage level may be set at a level to achieve a low $R_{ON}$ of the protection device 24 during normal operation. The second voltage level may be lower than the first level, and determined to prevent $V_{FB}$ from rising above $V_{max\_rat}$ of a load device 32 supplied by the step down converter 10.

Figure 10:
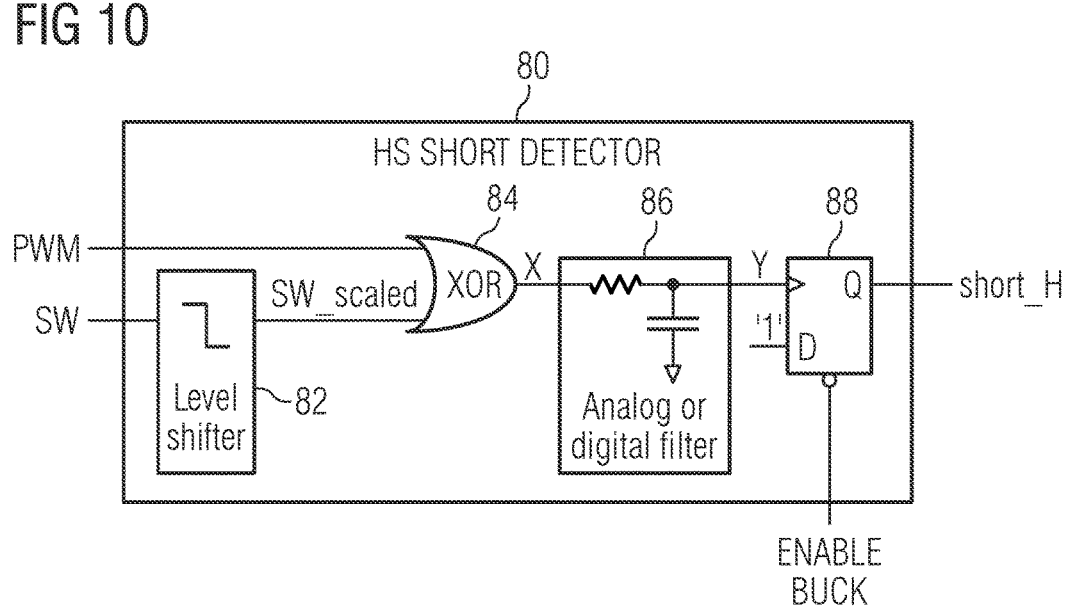
FIG. 10 is a schematic diagram of an exemplary high-side (HS) short detector.

The Short_H signal may be generated by a short detection circuit. An example HS short detector 80 is shown in FIG. 10. As shown in FIG. 10, a pulse width modulation (PWM) signal for controlling the high-side switch HS may be a first input to an XOR gate 84 and the signal SW_scaled may be the second input. The signal SW_scaled may be a level shifted version of the signal SW, wherein the polarities of PWM and SW_scaled are selected such that SW_scaled follows PWM.

The output of the XOR gate 84 may be the input of a filter 86, which may be a digital filter or an analog filter. The output of the filter 86 may be directed to a storage element 88.

Figure 11:
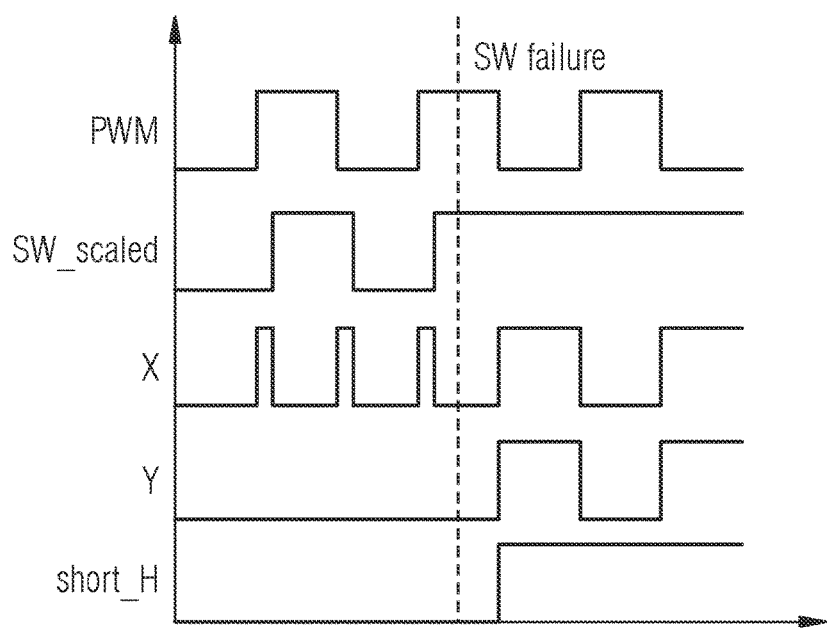
FIG. 11 illustrates exemplary waveforms for the HS short detector of FIG. 10.

As shown in FIG. 11, during normal operation, the polarity signal SW_scaled follows, with a time delay, the polarity of PWM. During the time delay between PWM and SW_scaled, the XOR output x goes to a high state. Following the time delay, the XOR output x goes to a low state. As further shown in FIG. 11, the filter 86 is configured such that the output signal y of the filter 86 remains low in normal operation.

As further shown in FIG. 11, a short of the high-side switch, from IN to SW causes the signal SW_scaled to go high. This results in the XOR 84 output signal x having longer high periods, resulting in the output of the filter 86 going high, and setting Short_H to a high level. According to FIG. 10, as one example, the signal Short_H may remain high until the step down converter 10 is disabled, resetting the storage element 88.

Figure 12:
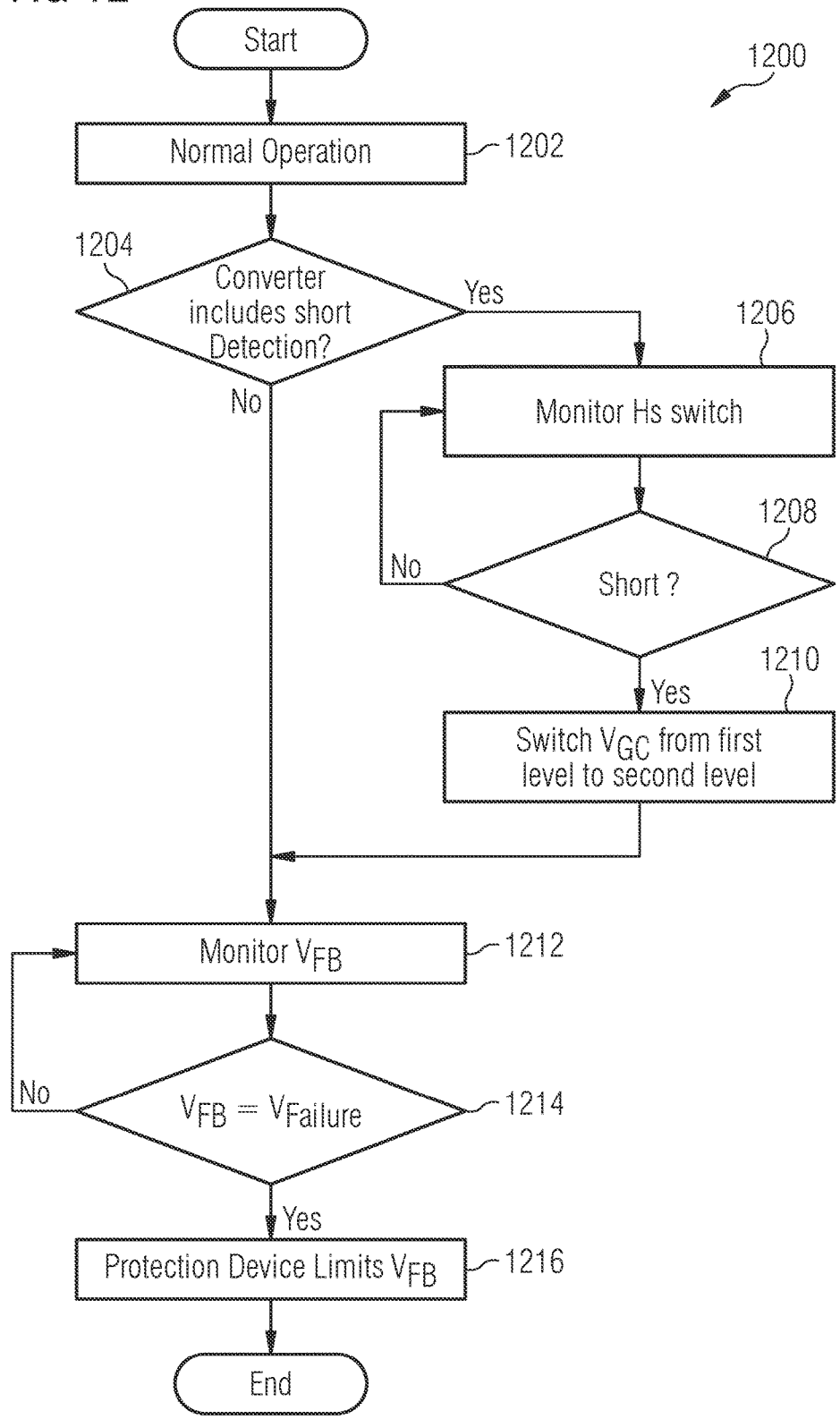
FIG. 12 is a diagram of an exemplary process for limiting the voltage on an output of a step down converter.

FIG. 12 is a diagram of an exemplary process 1200 for limiting a voltage on the output FB of the step down converter 10. The process 1200 starts in a block 1202.

In the block 1202, the step down converter 10 is in a normal operation mode. The step down controller 40 controls the high-side switch HS and low-side switch LS to generate a voltage on the output FB within a specified range of a target voltage $V_{target}$. As described above, the protection controller 26 generates a voltage $V_{GC}$ to control the protection device 24 such that an n-channel transistor 50 in the protection device 24 operates in the triode (linear) mode. Upon establishing normal operation, the process 1200 continues in a block 1204.

In the block 1204, in the case that the step down converter 10 includes a circuit to monitor for shorts of the high-side switch HS, the process 1200 continues in a block 1206. In the case that the step down converter 10 does not include a circuit to monitor for shorts of the high-side switch HS, the process 1200 continues in a block 1212.

In the block 1206, the step down controller 40, via a short detection circuit such as the HS short detector 80, monitors the high-side switch HS for a short condition. The process 1200 continues in a block 1208.

In the block 1208, the step down controller 40, via the short detection circuit such as the HS short detector 80, determines the existence of a short of the high-side switch HS. In a case that a short is detected, the process 1200 continues in a block 1210. In a case that no short is detected, the process 1200 continues in a block 1206.

In the block 1210, the step down controller 40 optionally switches $V_{GC}$ from a first level to a second lower level. The step down controller 40 may additionally generate and output a signal indicating that a short condition is present. The signal may be output, for example, to the load device 32. The process 1200 continues in a block 1212.

In the block 1212, which can follow from the block 1204 or from the block 1210, the protection device 24 monitors the output voltage $V_{FB}$ of the step down converter 10. That is, the protection device 24 is biased to switch from triode mode operation to saturation mode operation dependent on a level of the output voltage $V_{FB}$. The process 1200 continues in a block 1214.

In the block 1214, the step down converter 10 determines whether the voltage $V_{FB}$ is equal to $V_{failure} \sim V_{GC} - V_{TH}$. In a case that $V_{FB}$ is equal to $V_{failure}$, the process 1200 continues in a block 1216. Otherwise, the process 1200 continues in the block 1212.

In the block 1216, the protection device 24 limits the output voltage $V_{FB}$. The n-channel transistor 50 in the protection device 24 limits the current through the protection device 24 to match the current consumption of the total load on node FB, maintaining $V_{FB}$ at a voltage $V_{failure}$ just below a voltage that would turn off the n-channel transistor 50. The process 1200 ends.

Figure 13:
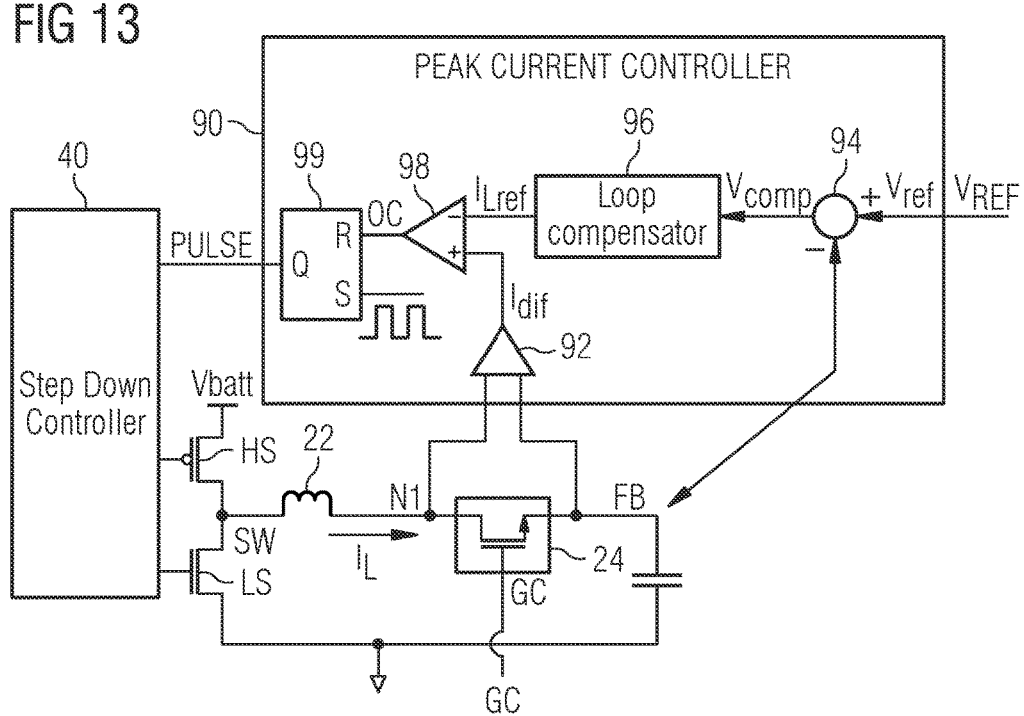
FIG. 13 is a schematic diagram of an exemplary peak current controller in communication with a step down controller.

In another example of the step down converter 10, the voltage drop $V_{dif}$ across the protection device 24 may be sensed, and used to implement a peak current control mode of the step down converter 10. As shown in FIG. 13, a sense amplifier 92 measures the voltage drop $V_{dif}$ across the protection device 24 from node N1 to node FB and generate a current $I_{dif}$ that represents the voltage $V_{dif}$.

Still referring to FIG. 13, a combination of component 94 and the loop compensator 96 generate a current $I_{Lref}$. $I_{Lref}$ indicates (as a scaled value) cycle by cycle the peak current through the inductance to generate a voltage on the output FB within a specified range of a target voltage $V_{target}$. The component 94 may, for example, generate a voltage $V_{comp}$ representing a difference between $V_{FB}$ and a reference voltage $V_{ref}$. The loop compensator 96 may convert $V_{comp}$ to the current $I_{Lref}$, and may further adjust the phase response of the control loop for controlling $V_{FB}$.

A comparator 98 compares the current $I_{dif}$ with the reference current $I_{Lref}$. Cycle by cycle when $I_{dif}$ overcomes the $I_{Lref}$ the comparator output resets the storage element 99 shutting OFF the high side switch HS and switching ON the low side switch LS.

Figure 14:
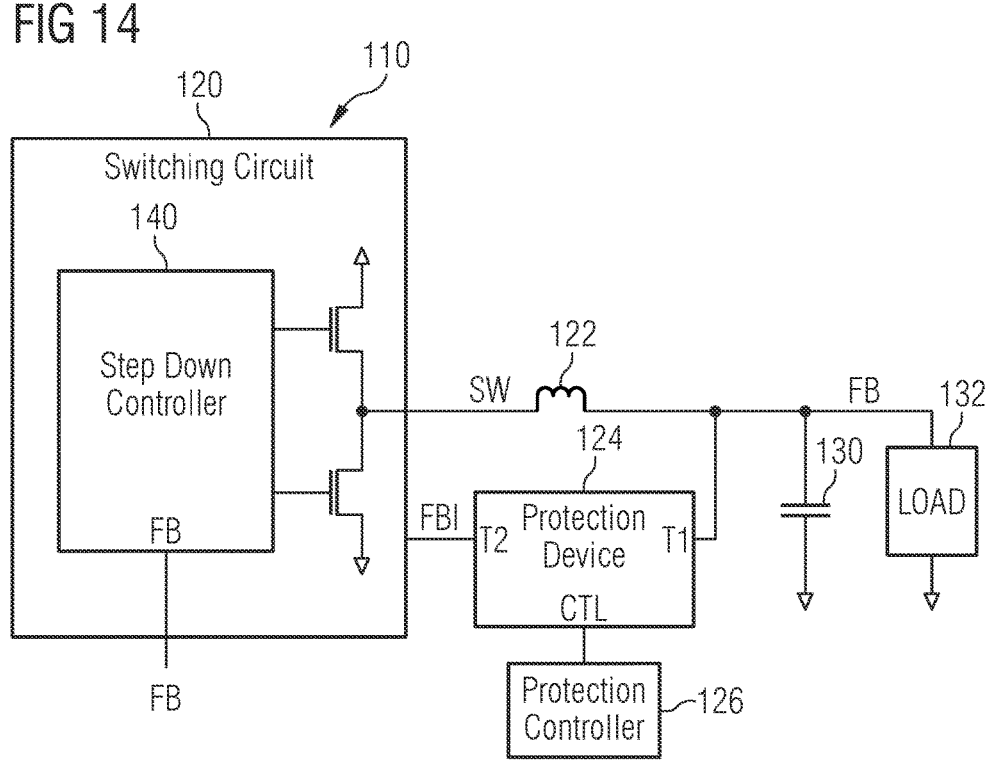
FIG. 14 is a diagram of an exemplary step down converter comprising a protection device coupled between a step down converter output (FB) and a feedback input (FBI).

FIG. 14 illustrates an example step down converter 110. The step down converter 110 is similar to the step down converter 10 and includes a switching circuit 120 which generates a switching output SW. The Switching output SW is coupled to a first terminal of the inductor 122. The second terminal of the inductor 122 is coupled to the node FB. The capacitor 130 is coupled from node FB to ground. As shown in FIG. 13, the node FB is an output of the step down converter 110, and is configured to supply one or more loads 132.

The switching circuit 120 includes a step down controller 140, a high-side switch HS and a low-side switch LS. The switching circuit 120 receives a signal FBI, representative of a voltage level $V_{FB}$ on the node FB, as an input, and is configured to control the step down converter 110 to generate $V_{FB}$ within a specified range of a target voltage $V_{target}$.

The step down converter 110 includes a protection device 124. A first terminal T1 of the protection device 124 is coupled to the node FB and a second terminal T2 of the protection device is coupled to the node FBI and is used as an input to the step down controller 140.

The step down converter 110 further includes a protection controller 126 which outputs a control voltage $V_{GC}$ on a node GC coupled to a control input CTL of the protection device 124. The voltage $V_{GC}$ is generated such that a voltage $V_{FBI}$, on the node FBI, does not rise above a predetermined voltage level $V_{max\_in}$, wherein $V_{max\_in}$ is the maximum allowable input voltage to the step down controller 140.

As described above with regard to the protection device 24, the protection device 124 may include a metal-oxide-semiconductor field-effect transistor such as the n-channel transistor 50. The drain, source, and gate may be coupled respectively to the first terminal T1, the second terminal T2 and the control terminal CTL of the protection device 124.

In this configuration, the current $I_{FB}$, used to supply load 132, does not flow through the protection device 124. Accordingly, the protection device 124 can be relatively high impedance as compared to the protection device 24 of the step down converter 10. However, in this configuration, the protection device 124 does not limit the voltage on FB, and accordingly does not protect the load 132 from overvoltage.

In the example step down converters 10, 110, the respective protection devices 24, 124 are described as including an n-channel metal-oxide-semiconductor field-effect transistor (n-channel transistor) 50. The n-channel transistor 50 may be an enhancement type and have a positive threshold $V_{TH}$. Alternatively, the n-channel transistor 50 may be a natural (or native) n-channel transistor 50 with a near zero threshold $V_{TH}$.

Alternatively, the protection devices 24, 124 may include other types of transistors such as a junction field-effect transistor (JFET), an npn bipolar junction transistor (BJT) or an npn Darlington transistor pair. In the case of the JFET, the drain can be coupled to the first terminal of the protection device, the source coupled to the second terminal, and the gate coupled to the control terminal. In the case of the BJT or the npn Darlington transistor pair, the collector can be coupled to the first terminal of the protection device, the emitter to the second terminal and the base to the control input. Additionally or alternatively, the protection devices 24, 124 may include an operational amplifier or transconductance amplifier.

Figure 15:
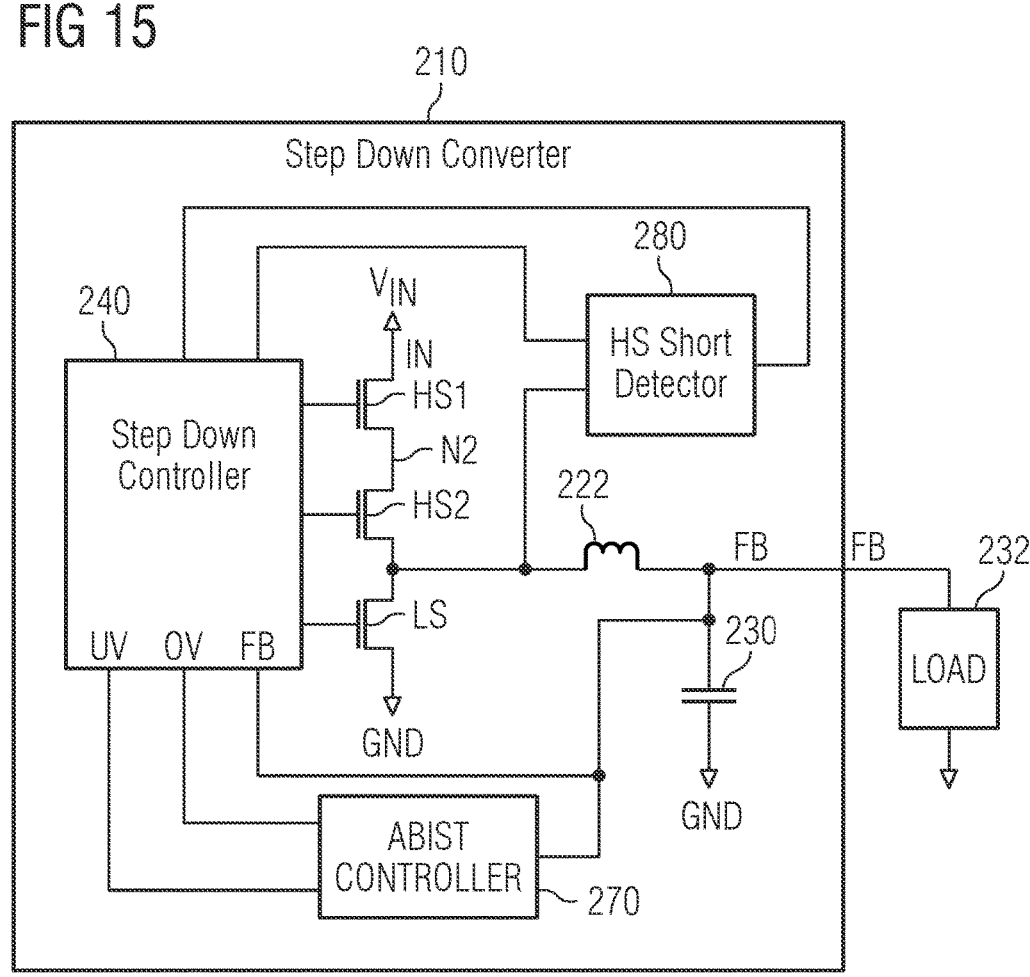
FIG. 15 is a diagram of an exemplary step down converter comprising a p-channel protection device in a series configuration with the high-side (HS) driver.

FIG. 15 illustrates another example of a step down converter 210 including overvoltage protection. The step down converter 210 includes a step down controller 240, a first high-side switch HS1, a second high-side switch HS2 and a low-side switch LS. First and second terminals of the first high-side switch are coupled respectively to the input IN and the node N2. First and second terminals of the second high-side switch HS2 are coupled respectively to the node N2 and a node SW. As described below, the second high-side switch HS2 may be operated as a protection device that is turned on during normal operation, and switched to replace the functionality of the first high-side switch HS1 in the case that the first high-side switch HS1 is shorted. The first and second terminals of the low-side switch LS are coupled respectively to GND and to the node SW.

The step down converter 210 further includes an inductor 222 and a capacitor 230. The first and second terminals of the inductor are coupled respectively to the nodes SW and FB. The first and second nodes of the capacitor 230 are coupled respectively to the nodes FB and GND.

The step down controller 240 is configured to control the first high-side switch HS1, the second high-side switch HS2 and the low-side switch LS. In normal operation, the second high-side switch HS2 is controlled to be ON continuously. In this case, the step down controller 240 controls the operation of the first high-side switch HS1 and the low-side switch LS such that the voltage $V_{FB}$ is within a specified range of a target voltage $V_{target}$.

The step down converter 210 further includes a HS short detector 280. The HS short detector 280 is configured to detect a short on the first high-side switch HS1 by monitoring the voltage on the node SW. The HS short detector 280 may, for example, be configured similar to the HS short detector 80 described above, and detect a short of the first high-side switch HS1 by observing the behavior of the node SW relative a node PWM used to control the first high-side switch HS1. Upon detecting that the first high-side switch HS1 is shorted, the HS short detector 280 may set a signal Short_H to a level indicating the fault and provide the signal Short_H to the step down controller 240.

The step down controller 240 is configured, in the case of receiving, via the signal Short_H, an indication that the first high-side switch HS1 is shorted, to switch the control of the second high-side switch HS2 to perform the function of the first high-side switch HS2. That is, the step down controller 240 will control the second high-side switch HS2 and the low-side switch LS such that the voltage $V_{FB}$ is within a specified range of $V_{target}$. The step down controller 240 controls the first high side switch HS1 to be ON continuously.

In this manner, the step down converter 210 can continue to operate and provide the supply voltage $V_{FB}$ to load devices in the case of a short of the first high-side switch HS1.

Still referring to FIG. 14, the step down converter 210 may further include an automatic built-in self-test (ABIST) controller 270. The ABIST controller 270 may operate in a similar manner to the ABIST controller 70. That is, the ABIST controller 270 may detect, in a condition when the first high-side switch HS1 is turned on, and the second high-side switch HS2 is turned off, that the voltage $V_{FB}$ is below a first level $V_{REFLO}$. The first level $V_{REFLO}$ may be selected to be, for example, 0.1 $V_{target}$. A level of $V_{FB}$ greater than or equal to the first level $V_{REFLO}$ may indicate a fault condition.

Further, the ABIST controller 270 may detect, in a case where the second high-side switch HS2 is turned on, and the step down controller 240 is switched to normal operation, that the voltage $V_{FB}$ is above a second level $V_{REFHI}$. $V_{REFHI}$ may be selected to be, for example, 0.9 $V_{target}$. A level of $V_{FB}$ less than or equal to the second level $V_{REFHI}$ may indicate a fault condition.

Further embodiments relate to the following examples:

1. A step down converter 10 comprising: a switching circuit 20 configured to control a switching output SW in order to generate an output voltage on a converter output FB within a specified range of a target voltage; an inductor 22 comprising a first terminal and a second terminal, the first terminal coupled to the switching output SW; and a protection device 24 coupled in series between the second terminal of the inductor 22 and the converter output FB and comprising a control terminal CTL, wherein the protection device 24 limits the output voltage supplied at the converter output FB based at least in part on a control voltage at the control terminal CTL.

2. The step down converter 10 according to example 1, wherein the protection device 24 limits the output voltage FB to a level above a maximum target voltage for the output voltage FB.

3. The step down converter 10 according to example 1 or 2, wherein the protection device 24 is one of an n-channel metal-oxide-semiconductor field-effect transistor 50, an npn bipolar junction transistor (BJT), an npn Darlington transistor pair and a junction field-effect transistor (JFET), an operational amplifier and a transconductance amplifier.

4. The step down converter 10 according to examples 1 or 2, wherein the protection device 24 comprises an n-channel metal-oxide-semiconductor field-effect transistor 50, with a drain 52 of the n-channel transistor 50 coupled to a first terminal T1 of the protection device 24 coupled to the second terminal of the inductor 22, a source 54 of the n-channel transistor 50 coupled to a second terminal T2 of the protection device 24 coupled to the converter output FB and a gate 56 of the n-channel transistor 50 coupled to the control terminal CTL of the protection device 24.

5. The step down converter 10 according to examples 1, 2 or 4, wherein the control voltage is greater than or equal to a maximum target output voltage on the converter output FB plus a threshold voltage of the n-channel transistor 50.

6. The step down converter 10 according to examples 1, 2, 4 or 5, further comprising a clamp 28 with a first terminal coupled to a first node N1 connecting the second terminal of the inductor 22 and the protection device 24 and a second terminal coupled to a ground potential, the clamp 28 configured to limit a voltage on the first node N1 to a predetermined level.

7. The step down converter 10 according to examples 1, 2, 4, 5 or 6, further comprising a detection circuit 80 configured to detect a short between a converter input IN and the switching output SW.

8. The step down converter 10 according to example 7, further comprising a protection controller 26 configured to generate the control voltage for the protection device 24, wherein, the protection controller 26 is configured to switch the control voltage of the protection device 24 from a first level to a second lower level based on the detection circuit 80 detecting the short between the converter input IN and the switching output SW.

9. The step down converter 10 according to example 7, wherein the detection circuit 80 provides an output to a load device 32 upon detecting the short between the converter input IN of the step down converter 10 and the switching output SW.

10. The step down converter 10 according to any examples 1, 2, or 4 to 9, further comprising a peak current controller 90, the peak current controller 90 comprising a sensing circuit configured to sense a first voltage from a first terminal T1 of the protection device 24 coupled to the second terminal of the inductor 24 to a second terminal T2 of the protection device 24 coupled to the converter output, and limit, based at least in part on the first voltage, a peak output current of the step down converter 10.

11. A device 60 comprising: a control circuit 40, HS, LS for a step down converter 10 comprising a switching output SW, the switching output SW configured to be coupled to a first end of an inductor 22, the control circuit 40, HS, LS configured to drive, via the switching output SW, the first end of the inductor 22 to generate an output voltage on a feedback node of the control circuit 40, HS, LS within a specified range of a target voltage; and a protection device 24 with a first terminal coupled to a protection input N1, a second terminal coupled to the feedback node FB, and a control input, the protection input N1 configured to be coupled to a second end of the inductor 22;

wherein, the protection device 24 is configured to limit the output voltage on the feedback node FB based in part on a control voltage applied to the control input.

12. The device 60 according to example 11, wherein the output voltage on the feedback node FB is limited by the protection device 24 to a level above a maximum target voltage for the step down converter 10.

13. The device 60 according to example 11 or 12, wherein the output voltage on the feedback node FB is limited by the protection device 24 to a level below a maximum rating of a load device 32 supplied by the feedback node FB.

14. The device 60 according to any of examples 11 to 13, wherein the protection device 24 comprises an n-channel metal oxide semiconductor field effect transistor 50, with a drain 52 coupled to the protection device input, a source 54 coupled to the feedback node, and a gate 56 coupled to the control input.

15. The device according to example 14, wherein the control voltage is greater than or equal to the target voltage on the feedback node FB plus a threshold voltage of the n-channel transistor 50.

16. The device according to any of examples 11 to 15, further comprising a detection circuit 80 configured to detect a short between a converter input IN and the switching output SW.

17. The device according to example 16, further comprising a protection controller 26 configured to switch the control voltage on the control input of the protection device 24 from a first voltage level to a second lower voltage level based on the detection circuit 80 detecting the short between the converter input IN and the switching output SW.

18. The device according to example 11 to 17, further comprising a clamp 28 with a first terminal coupled to the protection input N1 and a second terminal coupled to ground, the clamp 28 configured to limit a first voltage on the protection input N1 to a predetermined level.

19. A method comprising: controlling an n-channel metal oxide semiconductor field effect transistor 50 in a series circuit between a switching output SW of a step down converter 10 and an output node FB of the step down converter 10 to operate in triode mode; and switching the n-channel transistor 50 to operate in a voltage-follower mode wherein the n-channel transistor 50 prevents an output voltage of the step down converter 10 from being driven above a control voltage of the n-channel transistor 50 minus a threshold voltage of the n-channel transistor 50 when the output voltage of the step down converter 10 rises to or above a predetermined level.

20. The method according to example 19, further comprising: detecting a short between an input IN of the step down converter 10 and the switching output SW; and changing the control voltage on a gate of the n-channel transistor 50 from a first control voltage to a second lower control voltage.

21. Use of the step down converter 10 according to any one of examples 1 to 10 or the device 60 according to examples 11 to 18 to perform a method according to 19 or 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Computer-executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A step down converter comprising:
a control loop configured to regulate an output voltage on an output of the step down converter within a specified range of a target voltage, the control loop comprising:
a switching circuit configured to control a switching output in order to generate the output voltage;
an inductor comprising a first terminal and a second terminal, the first terminal coupled to the switching output; and
a protection device comprising a first terminal coupled to the second terminal of the inductor, a second terminal coupled to the output of the step down converter, and a control terminal, wherein the output of the step down converter is coupled to the switching circuit and provides feedback for the control loop; wherein:
during operation without a fault condition, the control loop regulates the output voltage and compensates for variations in a voltage drop across the protection device;
during operation with a fault condition that prevents the control loop from maintaining the output voltage within the specified range of the target voltage, the protection device limits the output voltage supplied at the output of the step down converter based on a control voltage at the control terminal to a level above the specified range of the target voltage and below a predetermined maximum level,
during operation without the fault condition, the protection device is biased in a linear mode,
during operation with the fault condition, the protection device is biased in a voltage-follower mode, and
the control voltage applied to the control terminal of the protection device is substantially the same during operation without the fault condition and during operation with the fault condition; and
the step down converter further comprises a clamp having a first terminal coupled to the first terminal of the protection device and a second terminal coupled to a ground potential, the clamp comprising a switching device and a bias circuit such that the switching device is biased to begin conducting current from the first terminal of the clamp to ground when a voltage on the first terminal of the clamp rises to a predetermined level, thereby limiting the voltage on the first terminal of the clamp to be substantially the same as the predetermined level.

2. The step down converter of claim 1, wherein the protection device is one of an n-channel metal-oxide-semiconductor field-effect transistor, an npn bipolar junction transistor (BJT), an npn Darlington transistor pair, a junction field-effect transistor (JFET), an operational amplifier and a transconductance amplifier.

3. The step down converter of claim 1, wherein the protection device comprises an n-channel metal-oxide-semiconductor field-effect transistor, with a drain of the n-channel metal-oxide-semiconductor field-effect transistor coupled to the first terminal of the protection device that is coupled to the second terminal of the inductor, a source of the n-channel metal-oxide-semiconductor field-effect transistor coupled to the second terminal of the protection device that is coupled to the output of the step down converter and a gate of the n-channel metal-oxide-semiconductor field-effect transistor coupled to the control terminal of the protection device.

4. The step down converter of claim 1, further comprising a detection circuit configured to detect the fault condition, wherein the fault condition indicates a fault between an input of the step down converter and the switching output.

5. The step down converter of claim 4, wherein the detection circuit provides an output to a load device upon detecting the fault condition between the input of the step down converter and the switching output.

6. The step down converter of claim 1, further comprising a peak current controller, the peak current controller comprising a sensing circuit configured to sense a first voltage from the first terminal of the protection device to the second terminal of the protection device, and limit, based at least in part on the first voltage, a peak output current of the step down converter.

7. A device comprising:
a control loop configured to regulate an output voltage on a converter output of a step down converter within a specified range of a target voltage, the control loop comprising:
a control circuit comprising a switching output and a feedback node, the switching output configured to be coupled to a first terminal of an inductor, the control circuit configured to drive, via the switching output, the first terminal of the inductor to generate the output voltage on the feedback node of the control circuit; and
a protection device with a first terminal coupled to a protection input, a second terminal coupled to the feedback node, and a control input, the protection input configured to be coupled to a second terminal of the inductor;
wherein:
during operation without a fault condition, the control loop regulates the output voltage and compensates for variations in a voltage across the protection device,
during operation with a fault condition that prevents the control loop from maintaining the output voltage within the specified range, the protection device is configured to limit the output voltage on the feedback node based on a control voltage applied to the control input to a level above the specified range of the target voltage and below a predetermined maximum voltage,
during operation without the fault condition, the protection device is biased in a linear mode,
during operation with the fault condition, the protection device is biased in a voltage-follower mode, and
the control voltage applied to the control input of the protection device is substantially the same during operation without the fault condition and during operation with the fault condition; and
the device further comprises a clamp having a first terminal coupled to the protection input and a second terminal coupled to a ground potential, the clamp comprising a switching device and a bias circuit such that the switching device is biased to begin conducting current from the protection input to ground when a voltage on the protection input rises to a predetermined level, thereby limiting the voltage on the protection input to be substantially the same as the predetermined level.

8. The device of claim 7, wherein the predetermined maximum voltage is less than or equal to a maximum rating of a load device supplied by the feedback node.

9. The device of claim 7, wherein the protection device comprises an n-channel metal oxide semiconductor field effect transistor, with a drain coupled to the protection input, a source coupled to the feedback node, and a gate coupled to the control input.

10. The device of claim 7, further comprising a detection circuit configured to detect the fault condition, wherein the fault condition indicates a fault between a converter input and the switching output.

11. A method comprising:
controlling, during operation without a fault condition, an n-channel metal oxide semiconductor field effect transistor in a series circuit between a switching output of a step down converter and an output node of the step down converter to operate in linear mode, wherein the step down converter regulates an output voltage on the output node to compensate for variations in a voltage drop across the n-channel metal oxide semiconductor field effect transistor and maintain the output voltage within a specified range of a target voltage;
detecting a fault condition that prevents the step down converter from maintaining the output voltage within the specified range; and
based on detecting the fault condition, controlling the n-channel metal oxide semiconductor field effect transistor to operate in a voltage-follower mode such that the step down converter is limited to driving the output voltage to a level above the specified range of the target voltage for the output voltage and below a predetermined maximum voltage; wherein
the n-channel metal oxide semiconductor field effect transistor comprises a first terminal and a second terminal, the second terminal connected to the output node,
the series circuit includes an inductor comprising a first terminal coupled to the switching output and a second terminal coupled to the first terminal of the n-channel metal oxide semiconductor field effect transistor,
the output node is coupled to a controller of the step down converter to provide feedback for regulating the output voltage, the step down converter further comprises a clamp having a first terminal coupled to the first terminal of the n-channel metal oxide semiconductor field effect transistor and a second terminal coupled to a ground potential, the clamp comprising a switching device and a bias circuit such that the switching device is biased to begin conducting current from the first terminal of the clamp to ground when a voltage on the first terminal of the clamp rises to a predetermined level, thereby limiting the voltage on the first terminal of the clamp to be substantially the same as the predetermined level, and controlling the n-channel metal oxide semiconductor field effect transistor based on detecting the fault condition comprises applying a control voltage on a gate of the n-channel metal oxide semiconductor field effect transistor that is substantially the same during operation without the fault condition and during operation with the fault condition.

\* \* \* \* \*